(12) United States Patent
Choukalos et al.

(10) Patent No.: US 6,246,254 B1
(45) Date of Patent: Jun. 12, 2001

(54) METHOD AND CIRCUIT FOR PROVIDING COPY PROTECTION IN AN APPLICATION-SPECIFIC INTEGRATED CIRCUIT

(75) Inventors: Charles N. Choukalos, Burlington; Alvar A. Dean, Essex Junction; Scott A. Tetreault, Georgia; Sebastian T. Ventrone, South Burlington, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,969

(22) Filed: Dec. 6, 1999

(51) Int. Cl.[7] ................................................. H03K 19/007
(52) U.S. Cl. ................................................. 326/8; 326/41
(58) Field of Search ...................................... 326/8, 39–41

(56) References Cited

U.S. PATENT DOCUMENTS

| | | | |
|---|---|---|---|
| 4,011,436 | 3/1977 | Schiller | 235/92 PE |
| 4,675,477 | 6/1987 | Thornwall | 380/21 |
| 4,812,675 | * 3/1989 | Goetting | 326/8 |
| 4,897,860 | 1/1990 | Lee et al. | 377/52 |
| 5,056,061 | 10/1991 | Akylas et al. | 365/96 |
| 5,182,770 | * 1/1993 | Medveczky | 380/4 |
| 5,377,264 | 12/1994 | Lee et al. | 380/4 |
| 5,386,469 | 1/1995 | Yearsley et al. | 380/3 |
| 5,452,355 | 9/1995 | Coli | 380/4 |
| 5,515,540 | 5/1996 | Grider et al. | 395/750 |
| 5,533,123 | 7/1996 | Force et al. | 380/4 |
| 5,537,055 | 7/1996 | Smith et al. | 326/8 |
| 5,765,197 | 6/1998 | Combs | 711/164 |
| 5,898,776 | * 4/1999 | Apland et al. | 326/41 |
| 5,915,017 | * 6/1999 | Sung et al. | 326/8 |

\* cited by examiner

*Primary Examiner*—Michael Tokar
*Assistant Examiner*—Don Phu Le
(74) *Attorney, Agent, or Firm*—Connolly Bove Lodge & Hutz

(57) ABSTRACT

A method for preventing illicit copying of an application specific integrated circuit (ASIC). The ASIC is defined by a net list which includes a timer circuit for disabling the ASIC. The timer circuit includes a plurality of stages which are distributed in different cores of the ASIC to inhibit detection and removal of the circuit. The timer times out after a period which is set to permit evaluation of the ASIC design. Following the time out period, further use of the ASIC design is inhibited.

18 Claims, 5 Drawing Sheets

METHOD AND CIRCUIT FOR PROVIDING COPY PROTECTION IN AN APPLICATION-SPECIFIC INTEGRATED CIRCUIT

BACKGROUND OF THE INVENTION

The present invention relates to a technique for preventing the unauthorized copying of proprietary application-specific integrated circuit (ASIC) designs. Specifically, a method and circuit is described which when used in designing ASIC circuits produces a circuit whose function has a limited lifetime.

The integrated circuit business includes a significant market for producing custom integrated circuits for various applications. The industry creates these ASIC components through a cooperative venture between the ASIC supplier and the customer who defines a design to be implemented in an ASIC. A course of business has developed between the manufacturer and customer which permits the ASIC design to be implemented using a core circuit defined by the manufacturer, which the customer then adapts to his own proprietary circuit designs. Using a hardware descriptive language, the manufacturer defines a core circuit which the customer will add to his proprietary circuitry. The basic circuit definitions created by the manufacturer are then given to the customer for use in creating the complete ASIC design. The core may be either a hard core, which represents the physical layout of the basic core circuitry around which the customer designs his proprietary circuitry, or a software model, or soft core, which defines the basic circuit of the manufacturer to which the customer adds his proprietary circuitry.

The soft core represents a compilation of a net list which defines the elements and interconnection between elements to carry out a basic circuit function. The compiled net list may be further encrypted by the manufacturer using standard public key encryption methods, and supplied to the user. The user may then encrypt the net list so that it may be further augmented using the hardware descriptive language to define connections between the circuitry and the user's proprietary circuitry. The completed design is returned as an encrypted net list to the manufacturer, who can then create the various masks to implement the ASIC in silicon.

The considerable design effort in these core circuit designs are vulnerable to theft or unauthorized use by other outside manufacturers to implement a customer's ASIC design. The disclosed net list of the core circuitry permits its disclosure to others who may copy the net list, and otherwise take possession of the manufacturer's core designs. The present invention provides the ability to protect a soft core from copying by others, while still permitting the customer to have the ability to modify the soft core in a design which can be manufactured by the legitimate manufacturer.

SUMMARY OF THE INVENTION

It is an object of this invention to provide a method to protect ASIC designs from illicit copying.

It is another object of this invention to provide a soft core ASIC design which provides an evaluation capability, but which will not produce a product which functions if produced by the manufacturing process of an unauthorized vendor.

These and other objects of the invention are provided for by a method which protects an ASIC design from illicit copying. The ASIC design begins as a core net list which defines basic circuit functions to be implemented in a silicon substrate. The core net list includes a description of elements within a block for carrying out the circuit function, as well as the interconnection between elements of different blocks having other circuit function. The net list also includes a circuit which functions to disable the ASIC when the ASIC is implemented in silicon. The circuit which functions to disable the ASIC is distributed among a plurality of the circuit blocks comprising the soft core in order to make its detection and removal difficult for an unauthorized vendor. The manufacturer of the device can remove the disabling function prior to reduction to a silicon component. Illicit copiers, however, not knowing where these components reside within the soft core net list, will not be able to render the design usable by extracting the disabling function.

In accordance with a preferred embodiment of the invention, the net list which defines the soft core for the ASIC includes a timer circuit, which is implemented to disable the ASIC chip after a time out period. The time out period is selected to be greater than the time to evaluate the ASIC design in a simulation facility. However, once the time for simulation has expired, the timer will disable the ASIC, and any additional use of the design, or a component made from the design, will not be possible. In other embodiments of the invention, events which occur in the ASIC circuit occurring after a period of time following a normal simulation and evaluation routine, are used to disable the ASIC.

The components which perform the disabling function are buried within different blocks of the simulation circuit. Thus, an examination of the net list does not readily reveal the location of these components to the user. Accordingly, any attempts to remove the disabling components are very difficult. On the other hand, when the user indicates to the vendor that they want the vendor to manufacturer devices using the defined circuitry, the disabling components may be readily removed from the net list defining the circuit design.

DESCRIPTION OF THE PREFERRED EMBODIMENT

Figure 1:
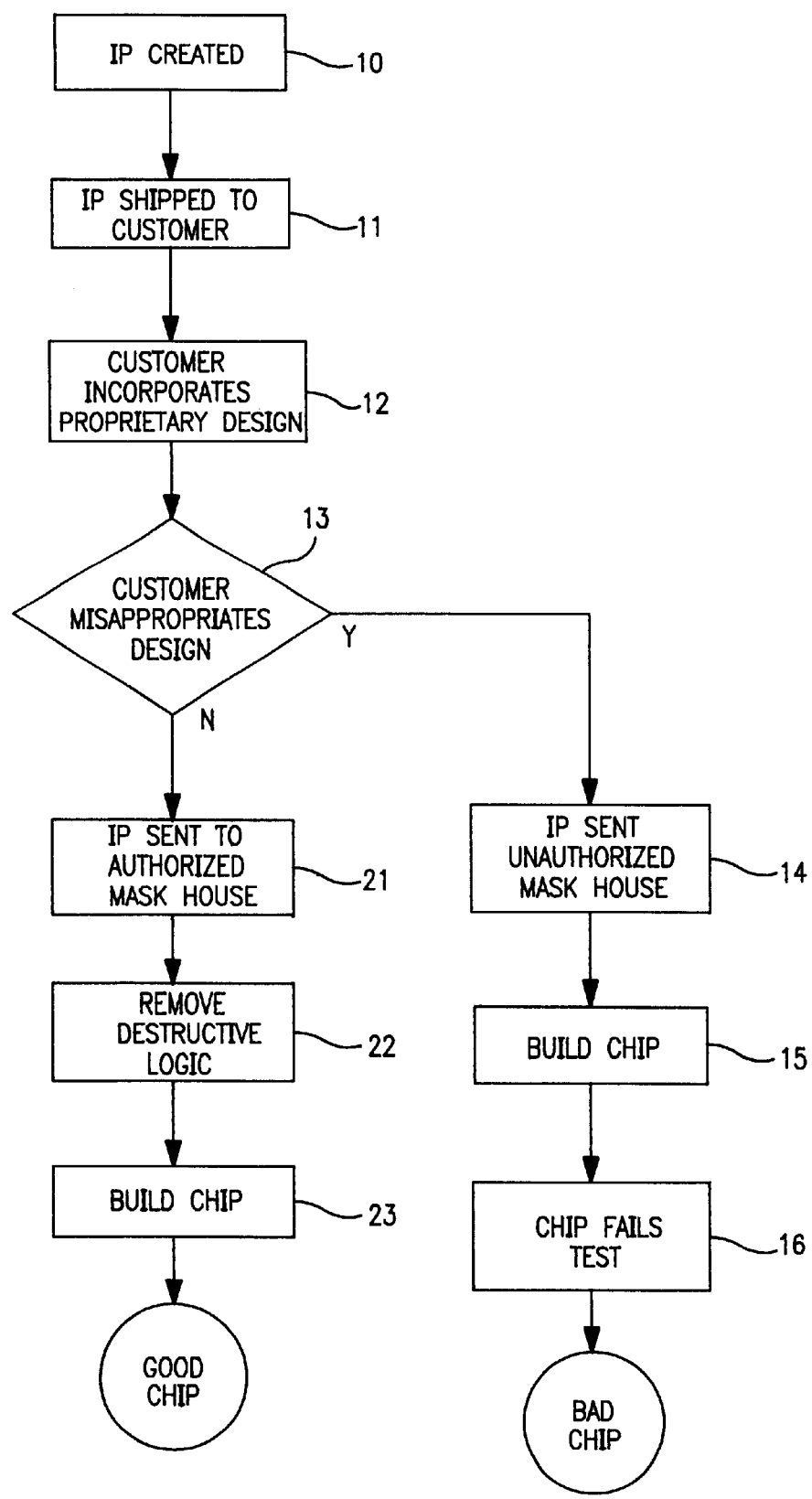
FIG. 1 illustrates a method in accordance with the invention for protecting proprietary circuit designs from unauthorized manufacture.

FIG. 1 illustrates the process for protecting an ASIC soft core. The ASIC soft core may, as is common in the integrated circuit manufacturing field, represent a basic circuit, such as a microprocessor, an interface between a microprocessor and external components, or any other typical function implemented as an ASIC core. The soft core includes multiple blocks which define different circuit functions making up the ASIC soft core. The vendor of ASIC products may supply to his customer a net list description of the components that make up the entire soft core. Once the vendee has possession of the net list, he may incorporate his own proprietary circuit with the ASIC soft core, and return a consolidated net list to the vendor. The vendor may then manufacture all the mask sets necessary for implementing the consolidated circuit design in silicon.

FIG. 1 represents the process for protecting the proprietary circuit design of a vendor. In step 10, the proprietary circuitry is defined as an ASIC soft core which includes a disable circuit embedded within various functional blocks of the soft core, and which is transparent to normal testing and simulation of the soft core. The soft core is shipped to a potential customer in step 11, and the customer incorporates the proprietary soft core with his own design in 12. As part of the design process, the customer validates the operation of the soft core and his own proprietary circuit design.

When the customer is satisfied with the design, he may return it to the soft core vendor in step 21. In the event that the customer attempts to appropriate the design, and forward the soft core design to another integrated circuit manufacturer in step 14, the embedded disable circuitry will prevent the manufacture of an operational component from the proprietary soft core and customer design. The manufactured ASIC soft core may pass various tests of the illicit vendor in step 16, but once it is manufactured in silicon, the ASIC will stop functioning during the testing phase, or once installed in an application.

Alternatively, if the customer returns the circuit design including the vendor soft core in combination with their own proprietary design to the legitimate vendor in step 21, the vendor can remove the disable circuitry which was introduced into the soft core in step 22. Following the removal of disable circuitry from the soft core, the ASIC may be manufactured in step 23 to produce a component without fear of an intentional malfunction due to the disable circuitry.

The disable circuitry which was present in the soft core is distributed among a plurality of different blocks of circuit functions implemented by the soft core so that it has low detectability, making it difficult for the customer, or unauthorized vendor, to locate and remove the disable circuitry. As will be illustrated with respect to FIGS. 2–7, the disable circuitry may be implemented in any number of different ways which does not interfere with the customer simulating the soft core and his own design, but will provide for the disable function if the design is used to manufacture an ASIC circuit.

Figure 2:
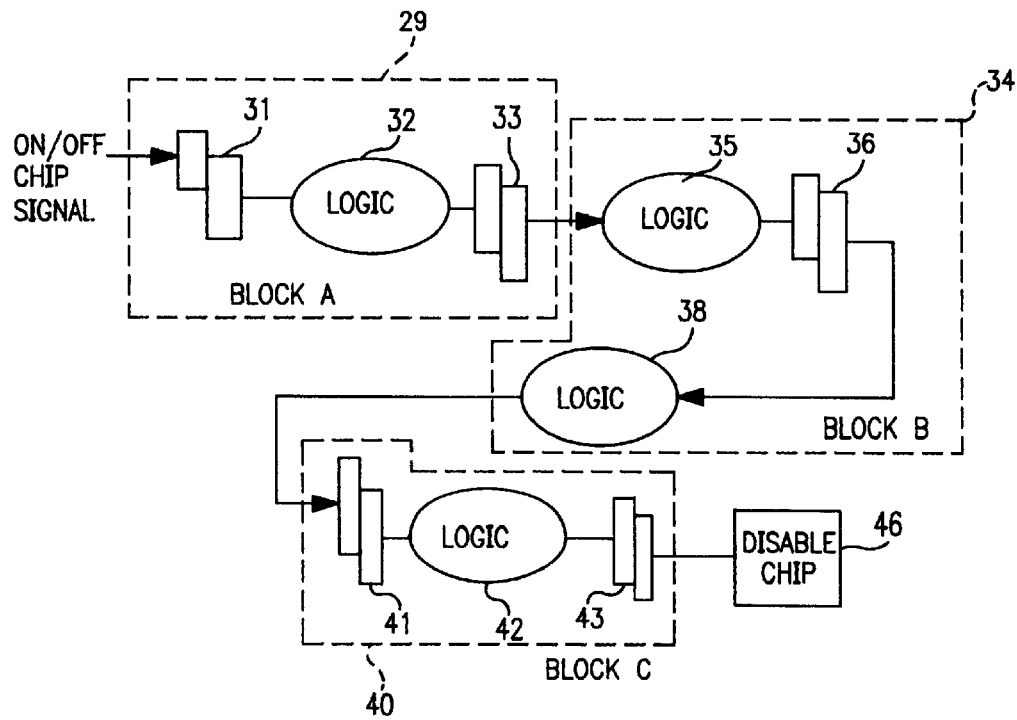
FIG. 2 illustrates a generic circuit design in accordance with the invention which is protected from unauthorized manufacturer.

FIG. 2 illustrates how the disable logic is maintained secret so that the unauthorized vendor may not remove it prior to manufacturing illicit copies of the circuit represented by the ASIC soft core. Various circuit functions are represented as blocks 29; 34, 40 and 46. The disable logic circuitry is distributed as components 32, 35, 38, 42 and 46 throughout the ASIC soft core which are interconnected via standard interfaces 31, 33, 36, 41 and 43 using the conventional net list descriptions which make up the various blocks of the ASIC soft core. The disable function is implemented by the last stage of the disable logic 46, which can be used to either disable a clock line, add data which is spurious to the circuit, or in any other number of ways interfere with the normal operation of the ASIC soft core function. By distributing the disable logic 32, 35, 38, 42 and 46, within different functional blocks of the ASIC soft core, it becomes exceedingly difficult to locate circuitry which is not integral to the function of the ASIC soft core, and which is used to disable the circuit. The functional description in FIG. 2 relies on a signal generated either Off-chip or ON-chip to initiate a sequence of events which result in disabling of the ASIC circuit. As will be evident with respect to the more specific implementations of FIGS. 3–7, during simulation the ASIC soft core functions, when a sufficient time has elapsed so that all possible simulations using the ASIC soft core function have been completed by the customer, the disable logic becomes active, permanently disabling the ASIC soft core from any further simulation and disabling any circuit manufactured using the soft core.

The disable logic circuit may take the form of a counter, shown in FIG. 3, which operates to disable the ASIC soft core function after a number of counts, or it may trigger on more random events, which would occur at a time which is significantly later than any simulation time needed by the customer for testing the soft core function.

Figure 3:
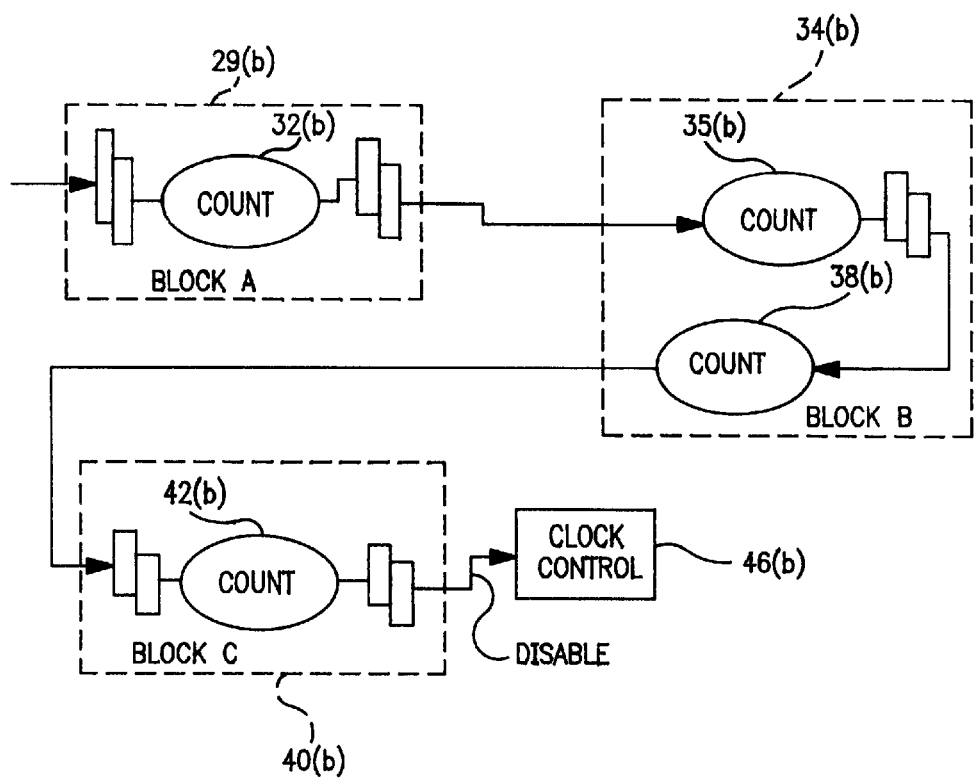
FIG. 3 illustrates the arrangement of a distributed counter circuit within an ASIC soft core which protects the circuit from unauthorized manufacture.

FIG. 3 includes a multi-stage counter comprising counter stages which may be implemented within the soft core for disabling the circuit after a particular number of the clock pulses have been counted. The disabling counter permits the circuit to function for a defined number of clock cycles. This will provide an opportunity for the vendee to evaluate the ASIC soft core function following the consolidation of the vendee's proprietary circuit design with the ASIC soft core. However, following a predetermined number of counts which exceed those necessary to evaluate the circuit, the counter will reach a final count, and disable the ASIC clock function of the clock control circuit in block 46(b). From this time forward, no further simulations would be possible.

The inclusion of the disabling circuitry on the ASIC soft core function protects the vendor's soft core design from implementation by other vendors who may acquire the net list supplied to the vendee. As will be evident with respect to FIG. 3, it is possible to bury the disabling circuitry within different cores 29(b), 34(b) and 40(b) of the net list so that any subsequent user of the ASIC soft core will not know where the disabling components are. However, when the legitimate vendor wishes to reduce the soft core and any circuitry provided by the vendee to silicon, it will be possible for the vendor to remove from the net list those components which provide the disabling function.

The ability to maintain the disabling components within the ASIC soft core circuitry secret is enhanced by embedding different stages of the counter of FIG. 3 in different core areas within the ASIC soft core circuitry net list. The net list will define the interconnection between the counter stages residing in different blocks of the ASIC soft core. As will be evident with respect to the description of the sample net list of FIG. 8, by placing portions of the disabling circuitry, comprising a counter having stages 32(b), 35(b), 38(b) and 42(b), as well as the disable logic 46(b), in different circuit blocks of the ASIC soft core, the ability for any unauthorized manufacturer to locate and remove the disabling circuits increases significantly.

Figure 4:
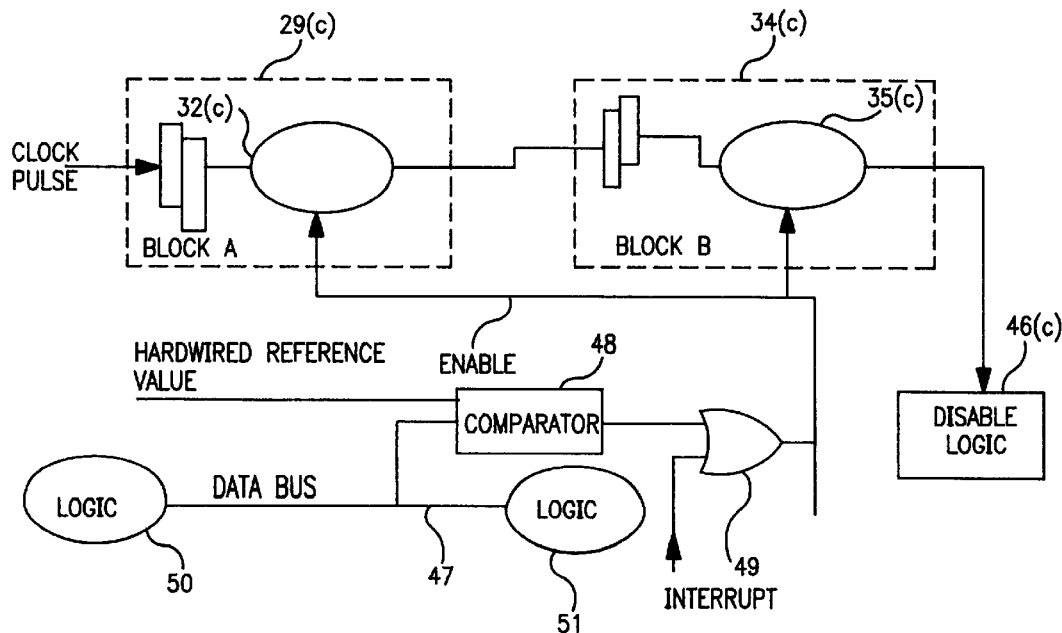
FIG. 4 illustrates a reduced length instruction counter for disabling the ASIC soft core in response to a detected event.

FIG. 4 is an alternative embodiment of an ASIC soft core having circuitry for disabling the ASIC soft core function, as well as any ASIC manufactured from the soft core after enough time has expired to permit the evaluation of the ASIC soft core in combination with a user's proprietary circuitry. The circuit of FIG. 4 pseudo-randomly generates a disable signal to the disable logic 46(c). The device in accordance with FIG. 4 also contemplates that different portions of the disabling circuit be located in different blocks within the ASIC soft core. The net list defines a counter having countersections 32(c) and 35(c) appropriately interconnected, embedded in different blocks 29(c) and 34(c) of the ASIC soft core. The soft core may represent a microprocessor or other digital device which is responsive to an external interrupt. The counter counts to a maximum count and then disables control logic 46(c), placing the ASIC data bus 26 in a disabled state. The counter is enabled to count clock pulses only when a data value is detected on data bus 47 interconnecting logic 50 and 51 of the ASIC soft core, which equals or exceeds a hard wired reference value applied to the reference input of comparator 48. Additionally, if an off-chip generated interrupt is received, the counter is enabled to count clock pulses through OR circuit 49.

The ability to embed disable circuitry within the ASIC soft core so that the soft core design may not be copied into silicon without producing a non-functioning component, is effected by embedding different portions of the disable circuitry in different cores of the ASIC. The components of the disable circuitry are interconnected via the net list defining the cores, and the ability to locate components which form the disable circuitry is significantly decreased. However, the vendor supplying the design in the form of a net list for use by its customers has full control in removing the disable circuitry components from the net list when manufacturing the ASIC circuitry in silicon.

Figure 5:
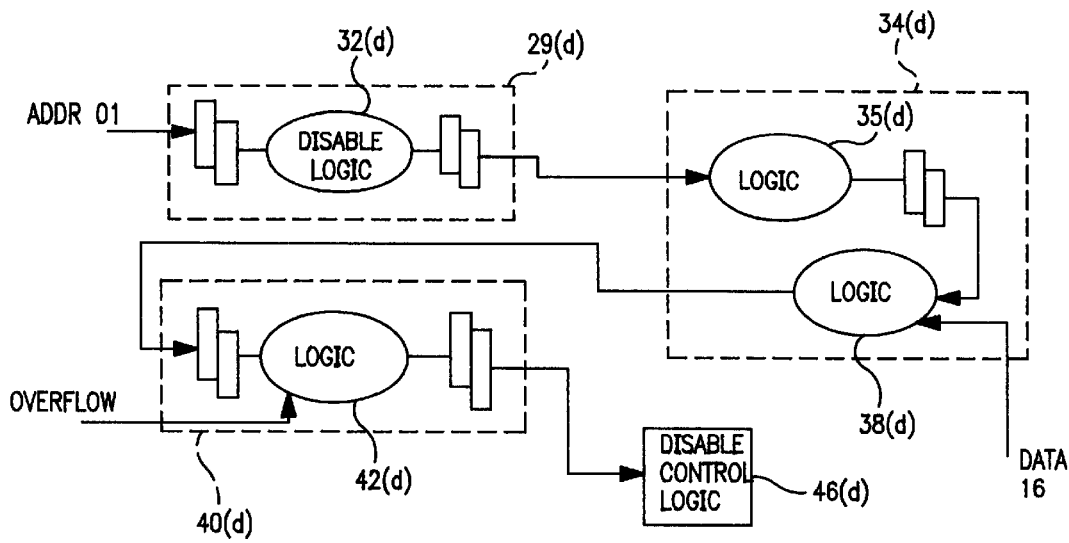
FIG. 5 illustrates a disable circuit which operates in response to an event occurring in the ASIC.
Figure 6:
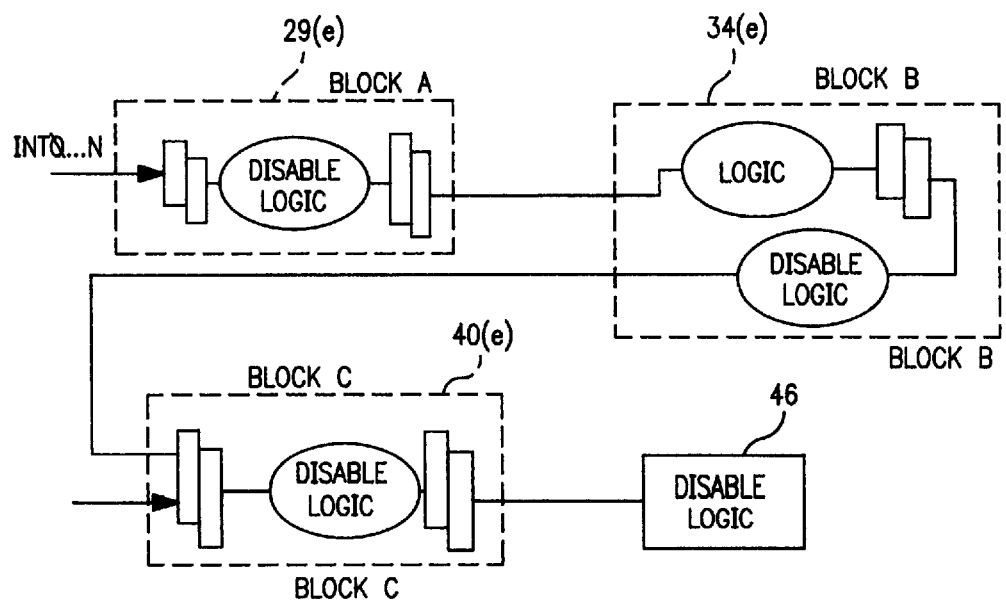
FIG. 6 illustrates a disable circuit which operates in response to an interrupt received by the ASIC.
Figure 7:
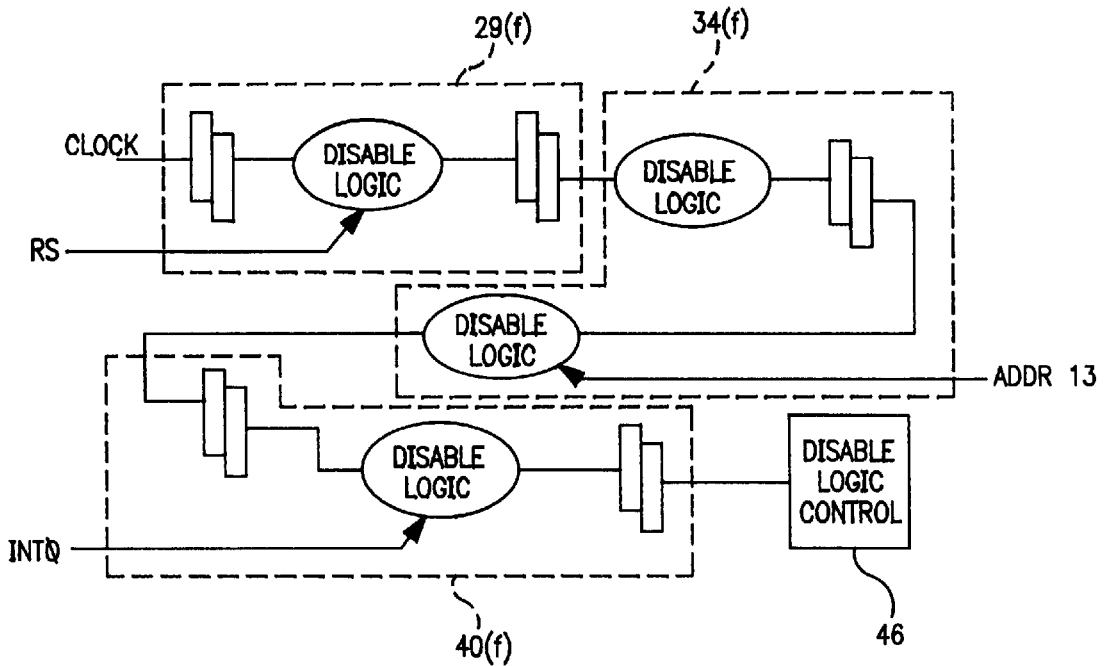
FIG. 7 illustrates a disable circuit which operates in response to a combination of events which occur in the ASIC.

Other examples of disable circuitry which is distributed throughout the ASIC soft core to inhibit detection by illicit manufacturers are shown in FIGS. 5–7. In FIG. 5, it is contemplated that a disabling event would constitute either a particular address detected on an address bus of the ASIC soft core, or an overflow condition detected in some portion of the normally functioning ASIC soft core. Other conditions may include specific data detected in the ASIC soft core during simulation which initiates a disabling circuit. Distributing the disable logic 32(*d*), 35(*d*), 38(*d*) and 42(*d*) and the control logic 46(*d*) through various circuit blocks 29(*d*), 34(*d*), 40(*d*) of the ASIC soft core, retains the ability to discourage attempts to locate and remove the disable circuitry. In the embodiment shown in FIG. 5, any combination of an address, overflow or detected data could be utilized to initiate the disabling function as long as the selected combination permits sufficient time to permit the customer to evaluate the soft core in its intended application.

FIG. 6 represents still another example of how disable circuitry may be implemented blocks 29(*e*), 34(*e*), 40(*e*) of an ASIC soft core which operates in response to still other criteria to initiate the disable function. In accordance with FIG. 6, interrupts to the ASIC soft core during simulation will initiate a disable function. A chip reset pulse may also be used, either alone or in combination with the interrupt, to initiate the disabling of the ASIC soft core.

FIG. 7 represents still another embodiment where the disable circuitry distributed throughout the ASIC soft core in different blocks 29(*f*), 34(*f*), 40(*f*) and 46 operates in response to a combination of events occurring in the ASIC. In the embodiment of FIG. 7, a clock, system reset, interrupt and a particular address ADDR detected on a bus of the ASIC soft core are used to initiate disabling of the ASIC. Each of these events may be used either alone or in combination with each other or with the other events for initiating the disable function.

The disable function has been described with respect to the embodiment of FIG. 3 which disables the ASIC clock. Other disabling techniques may be implemented for disabling, or corrupting the software model in response to a data event. The techniques may include any disruption to the operation of the software model, or product made from the software model, which occurs following detection of a triggering event. A corrupting event may be disabling the clock function, inserting erroneous data on a data bus, changing the value on an address bus, or changing the value of a control signal. Any or all of these effects, whether used in combination or separately, can be used to destroy the functionality of the product made from the software model.

Figure 8:
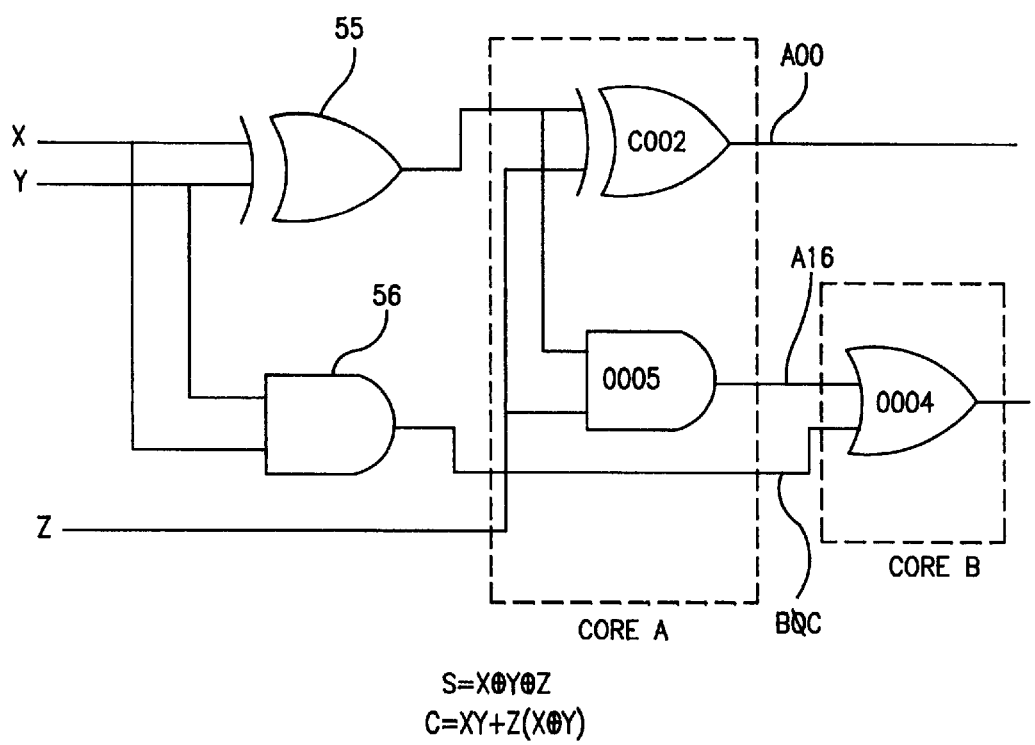
FIG. 8 illustrates the process of embedding disable circuitry within multiple blocks of an ASIC soft core.

FIG. 8 illustrates how the disable circuit may be embedded in different blocks of the ASIC soft core. A circuit block which functions as a full adder circuit is shown comprising exclusive OR gate 55 and AND gate 56. An OR gate 0002 and an AND gate 0005 are embedded in core A as part of the disable circuitry. A further component of the disable circuitry, OR gate 0004, is embedded in yet another block of the ASIC.

The first block of the ASIC, block A, can be represented by the following net list:

```
Output ( A00, A01, A02, A03, A04, A05, A06, A07, A08, A09,
         A10, A11, A12, A13, A14, A15, A16, A17, A18, A19,
         A20, A21, A22, A23, A24, A25, A26, A27, A28, A29,
         A30, A31, A32, A33, A34, A35, A36, A37, A38, A39,
         A40, A41, A42, A43, A44, A45, A46, A47, A48, A49,
         A50, A51, A52, A53, A54, A55, A56, A57, A58, A59,
         A60, A61, A62, A63, A64, A65, A66, A67)
Input  ( C00, C01, E02, F00, F01, F02, B0C, E01, E28, E333,
         E44, E55, G11, RESET, REPEAT, C02, C44,
         DATA00, DATA01, DATA02, TEST, SCANIN)
begin
AND  0000 (0000_10, C00, RESET);
OR   0001 (0001_10, C00, RESET);
OR   001 (001_10, 0000_10, G1 1, TEST);
XOR  0002 (A0O, C0O, E02);
NOT  0004 (A60, C00);
AND  0005 (A16, C00, E02);
OR   0006 (A20, 0003_10, 0001_10, DATA00);
end
```

From the above net list, the connections of the various outputs are defined from A00 to A67. Inputs to the devices of block A are also defined. For each device within block A, two of such devices XOR gate 0002 and AND gate 0005 are defined in terms of their outputs and two inputs. The outputs are represented by A00–A67, which are wires within the net list. The inputs to the devices of block A are shown adjacent the output as C00, E02 and C00, E02. The remaining devices of the block A net list are not shown in the Figure.

Block B containing component 0004, an OR gate, has a net list shown as net list of block B:

```
                              Block B
Output ( B00, B01, B02, B03, B04, B05, B06, B07, B08, B09,
         B10, B11, B12, B13, B14, B15, B16, B17, B18, B19,
         B20, B21, B22, B23, B24, B25, B26, B27, B28, B29,
         B30, B31, B32, B33, B34, B35, B36, B37, B38, B39,
         B40, B41, B42, B43, B44, B45, B46, B47, B48, B49,
         B50, B51, B52, B53, B54, B55, B56, B57, B58, B59)
Input  ( A16, B02, E02, F00, F01, G09, B0F, B0E
         E32, E12, G17, RESET, DATA08, DATA09,
         DATA10, TEST SCANIN)
begin
AND  0000 (0000_10, C00, RESET);
OR   0001 (0001_10, G11, TEST);
X0R  0002 (B19, 0000_19, DATA10, TEST)
NOT  0004 (0003_10, 000_10);
OR   0004 (B57, A16, B0C);
end
```

The above net list includes OR gate 0004, having an output identified as B57, and two inputs A16 and B0C.

From the foregoing net lists from blocks A and B of an ASIC for performing a full adder function, it is clear that components such as X OR gate 0002, AND gate 0005, and OR gate 0004 can be buried in the net list, with their function undisclosed to a user. However, the vendor, knowing advance the location of these components within the net list may extract the same before implementing the circuit in silicon.

Thus, there has been described with respect to one embodiment of the invention, a method for protecting ASIC designs from copying by implementing disabling circuitry, which may be removed from the design by the vendor before implementing the design in silicon.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An IC chip comprising:

a plurality of functional circuit blocks;

a low detectability circuit for disabling at least one of the functional circuit blocks in response to a disable signal, the low detectability circuit comprising:

a disable circuit including portions distributed among the plurality of functional circuit blocks, the portions connected together during operation of the IC for outputting the disable signal when the disable circuit is operational.

2. The IC chip according to claim 1 wherein said disable circuit comprises:

a counter having a plurality of stages distributed throughout said functional circuit blocks having an output which disables said IC chip.

3. The IC chip according to claim 2, wherein said counter disables a clock in said IC chip.

4. The IC chip according to claim 1 wherein said disable circuit operates in response to the detection of an interrupt received by said ASIC.

5. The IC chip according to claim 1 wherein said disable circuit operates in response to data appearing on a bus of said chip.

6. The IC chip according to claim 1 wherein said disable circuit operates on detection of a combination of events on said chip.

7. A circuit for implementing in an ASIC which discourages copying of said ASIC comprising:

a counter which is connected to count pulse events occurring in said ASIC having an output when a number of pulses have been counted which exceeds a number of pulses used to verify said ASIC design during simulation of said ASIC, said counter being implemented from a number of counter stages which occupy different core locations on said ASIC to obscure detection of said counter, and connected together by connections defined on a net list; and logic circuitry for disabling said ASIC when said counter produces said output.

8. A circuit for implementing in an ASIC according to claim 7 further comprising:

a comparator for comparing data on a data bus of said ASIC with a fixed data value, and for enabling said counter to count when said data bus produces said fixed data value.

9. The circuit for implementing in an ASIC according to claim 8, further comprising means for enabling said counter when an interrupt is received by said ASIC.

10. A method for protecting ASIC designs from copying comprising:

providing a core net list which defines a circuit to be implemented in a silicon substrate;

including in said net list the definition of a circuit element which will interfere with the operation of said circuit to be implemented which is not active when said circuit is being simulated in a circuit simulator, and which is active when said circuit is implemented on a silicon substrate; and removing said circuit element definition from said net list.

11. The method according to claim 10 wherein said circuit element responds to a plurality of pulse events which exceed a number of such events encountered in a simulation of said circuit.

12. The method according to claim 11, wherein said circuit element comprises a counter which disables said circuit to be implemented in silicon.

13. The method according to claim 11, wherein said circuit element is a counter which is enabled to count pulse events in response to an interrupt event generated by said circuit.

14. The method according to claim 13, wherein said counter is enabled to count pulses when a data event is detected on a bus of said circuit.

15. A circuit for implementing in an ASIC which discourages copying of said ASIC comprising:

counter means having an output when said ASIC operates for a time which exceeds a time to verify said ASIC design, said counter means having a plurality of stages embedded in different portions of said ASIC to obscure its detection; and logic circuitry for disabling said ASIC in response to said counter.

16. The circuit for implementing in an ASIC according to claim 15 wherein said counter provides an overflow bit as said output.

17. The circuit for implementing an ASIC according to claim 15, wherein said timer means is enabled by an interrupt generated in said ASIC.

18. The circuit for implementing an ASIC according to claim 15, further comprising means for enabling said timer in response to a pulse event occurring on said ASIC.

* * * * *